(12) United States Patent
Chen et al.

(10) Patent No.: US 7,585,810 B2
(45) Date of Patent: Sep. 8, 2009

(54) METHOD FOR PARTIAL OXIDATION OF HYDROCARBONS, CATALYST MEMBER THEREFOR AND METHOD OF MANUFACTURE

(75) Inventors: Laiyuan Chen, Broken Arrow, OK (US); Jeffrey G. Weissman, Broken Arrow, OK (US)

(73) Assignee: Umicore AG & Co. KG, Hanau (DE)

( * ) Notice: Subject to any disclaimer, the term of this patent is extended or adjusted under 35 U.S.C. 154(b) by 764 days.

(21) Appl. No.: 10/931,436

(22) Filed: Sep. 1, 2004

(65) Prior Publication Data

US 2006/0045843 A1 Mar. 2, 2006

(51) Int. Cl.
  *C01B 3/26* (2006.01)
  *B01J 23/755* (2006.01)
(52) U.S. Cl. .................. 502/326; 502/304; 502/259; 502/315; 502/337; 502/230; 502/261; 423/138
(58) Field of Classification Search ............. 502/304, 502/259, 315, 337, 166, 223, 230, 261, 326; 423/138
See application file for complete search history.

(56) References Cited

U.S. PATENT DOCUMENTS

| | | | |
|---|---|---|---|
| 4,087,259 A | 5/1978 | Fujitani et al. | 48/212 |
| 4,844,837 A | 7/1989 | Heck et al. | 252/373 |
| 5,057,483 A | 10/1991 | Wan | 502/304 |
| 5,063,192 A | 11/1991 | Murakami et al. | 502/303 |
| 5,510,056 A | 4/1996 | Jacobs et al. | 252/373 |
| 5,628,931 A | 5/1997 | Lednor et al. | 252/373 |
| 5,648,582 A | 7/1997 | Schmidt et al. | 585/652 |
| 5,677,258 A | 10/1997 | Kurokawa et al. | 502/303 |
| 5,744,419 A | 4/1998 | Choudhary et al. | 502/326 |
| 5,763,351 A | 6/1998 | Ichimura et al. | 502/303 |
| 5,942,346 A | 8/1999 | Ahmed et al. | 429/20 |
| 6,110,861 A | 8/2000 | Krumpelt et al. | 502/326 |
| 6,207,122 B1 | 3/2001 | Clawson et al. | 423/418.2 |
| 6,221,280 B1 | 4/2001 | Anumakonda et al. | 252/372 |
| 6,294,140 B1 | 9/2001 | Mussmann et al. | 423/213.5 |
| 6,303,098 B1 | 10/2001 | Kramarz et al. | 423/656 |
| 6,328,945 B1 | 12/2001 | Hufton et al. | 423/418.2 |
| 6,402,989 B1 | 6/2002 | Gaffney | 252/373 |
| 6,409,940 B1 | 6/2002 | Gaffney et al. | 252/373 |
| 6,436,363 B1 * | 8/2002 | Hwang et al. | 423/651 |
| 6,458,334 B1 | 10/2002 | Tamhankar et al. | 423/418.2 |
| 6,488,907 B1 | 12/2002 | Barnes et al. | 423/418.2 |
| 6,544,439 B1 | 4/2003 | Lewis et al. | 252/373 |

(Continued)

FOREIGN PATENT DOCUMENTS

WO  WO 95/351152  12/1995

*Primary Examiner*—Jessica L Ward
*Assistant Examiner*—Erin B Saad
(74) *Attorney, Agent, or Firm*—Robert G. Weilacher; Smith, Gambrell & Russell

(57) ABSTRACT

A catalyst member formed of a substrate configured for gas flow therethrough, a base metal catalytic component disposed in a base metal catalytic layer on the substrate, and a rhodium catalytic material disposed in a rhodium layer. The base metal catalytic component is formed of a base metal; namely, nickel, cobalt, or a combination of at least one of the foregoing base metals. The catalyst member is made by depositing a base metal catalytic component on a substrate configured for gas flow therethrough, and depositing a rhodium catalytic material over the base metal catalytic component.

17 Claims, 9 Drawing Sheets

U.S. PATENT DOCUMENTS

| | | | |
|---|---|---|---|
| 6,579,510 B2 | 6/2003 | Keller et al. | 423/573.1 |
| 6,635,191 B2 | 10/2003 | Figueroa et al. | 252/373 |
| 6,645,439 B2 | 11/2003 | Zhang et al. | 422/177 |
| 6,680,006 B2 | 1/2004 | Chantal | 252/373 |
| 6,749,828 B1 * | 6/2004 | Fukunaga | 423/651 |
| 2003/0061860 A1 * | 4/2003 | Hu et al. | 73/23.31 |

* cited by examiner

METHOD FOR PARTIAL OXIDATION OF HYDROCARBONS, CATALYST MEMBER THEREFOR AND METHOD OF MANUFACTURE

BACKGROUND

Fuel cells are electrochemical devices that convert chemical potential energy into usable electricity and heat without combustion as an intermediate step. Fuel cells are similar to batteries in that both produce a DC current by using an electrochemical process. A fuel cell has two electrodes, an anode and a cathode, that are separated by an electrolyte. Like batteries, fuel cells are combined into groups, called stacks, to obtain a usable voltage and power output. Unlike batteries, however, fuel cells do not release energy stored in the cell, running down when stored energy is gone. Instead, they convert energy from a hydrogen-rich fuel directly into electricity and operate as long as they are supplied with the fuel and oxidant. Fuel cells emit almost none of the sulfur and nitrogen compounds released by conventional combustion of gasoline or diesel fuel, and can utilize a wide variety of fuels: natural gas, coal-derived gas, landfill gas, biogas, alcohols, gasoline, or diesel fuel oil. Accordingly, there is a desire to employ fuel cells to power motor vehicles as a way of reducing noxious emissions.

Methods for generating hydrogen-rich fuel for a fuel cell from petroleum-based hydrocarbons include steam reforming and partial oxidation. Between these two methods, steam reforming is disadvantageous because it requires a sizeable apparatus that requires a heat source to maintain its operation, whereas partial oxidation can be achieved in a catalytic process that utilizes a smaller reactor size than steam reforming. In addition, a catalytic partial oxidation apparatus on an automotive vehicle typically attains its operation more quickly after the engine is started than does a vehicle-based steam reforming apparatus. However, catalytic partial oxidation reactions typically occur at 900° C. to 1100° C., at which temperatures the catalytic activity often degrades and the rate of production of hydrogen and carbon monoxide declines.

There is therefore a need for an improved method for catalytic partial oxidation and for a catalyst member having improved durability.

SUMMARY OF THE INVENTION

In one embodiment, a catalyst member can comprise a substrate configured for gas flow therethrough, a base metal catalytic component disposed in a base metal catalytic layer on the substrate, and a rhodium catalytic material disposed in a rhodium layer. The base metal catalytic component can comprises a base metal selected from the group consisting of nickel, cobalt, and a combination comprising at least one of the foregoing base metals.

In one embodiment, the catalyst member can be made by depositing a base metal catalytic component on a substrate configured for gas flow therethrough and depositing a rhodium catalytic material over the base metal catalytic component.

In one embodiment, a method for catalyzing the partial oxidation of hydrocarbons in a gas stream comprises contacting a catalyst member with the gas stream and converting hydrocarbon in the gas stream to hydrogen. The catalyst member can have an activity loss for the generation of the hydrogen of less than or equal to 3% for a period of greater than or equal to about 1,000 minutes when tested with an input stream comprising gasoline vapor at a temperature of about 250° C. at a space velocity of about 44,500 hour$^{-1}$, a stoichiometric oxygen/carbon ratio of about 1.05:1, and at catalyst operating temperatures of about 950° C. to about 1,050° C.

The above-described and other features will be appreciated and understood by those skilled in the art from the following detailed description, drawings, and appended claims.

BRIEF DESCRIPTION OF THE DRAWINGS

Referring now to the figures, which are exemplary embodiments, and wherein the like elements are numbered alike.

DETAILED DESCRIPTION OF INVENTION

Figure 1:
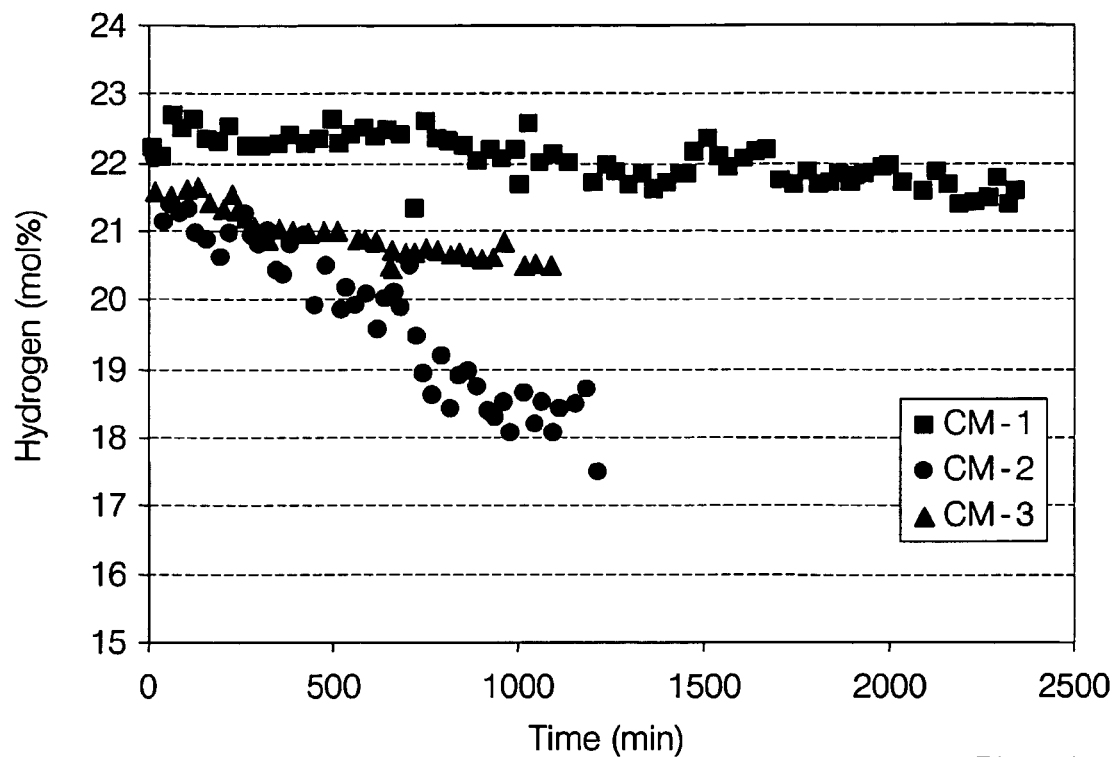
FIGS. 1-4 are plots of the relative hydrogen, carbon monoxide, methane and ethane-plus-ethylene content of effluent test gases of catalyst members described in Example 1 herein.
Figure 2:
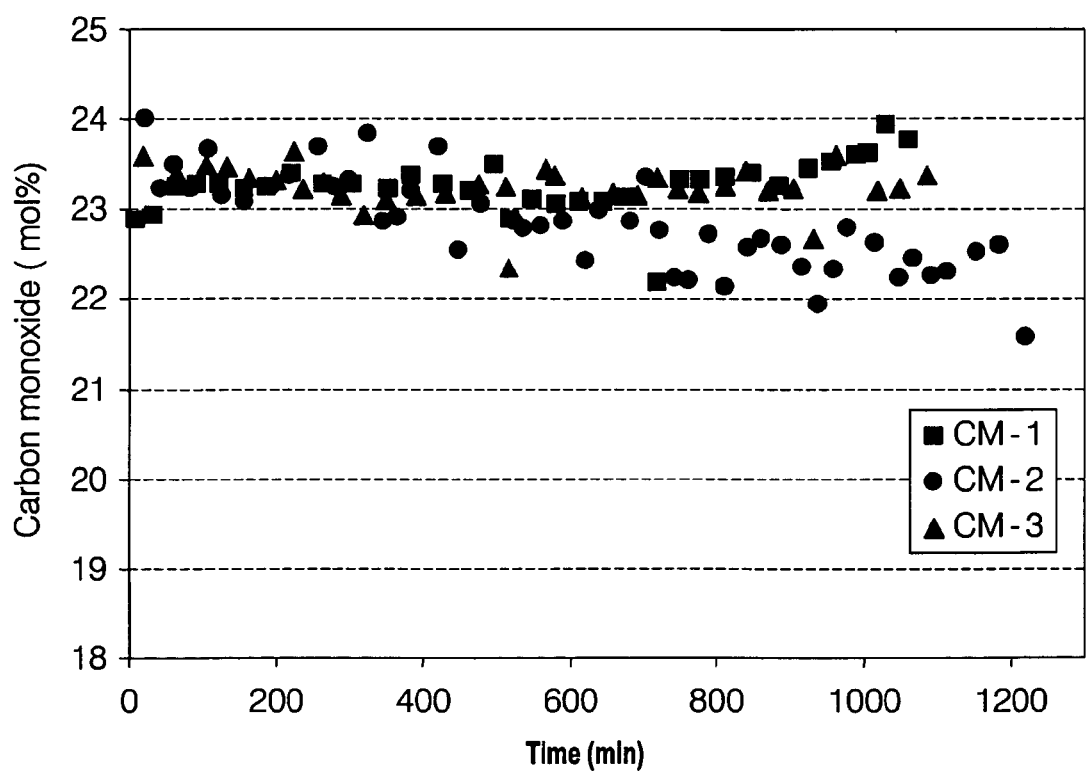
Figure 3:
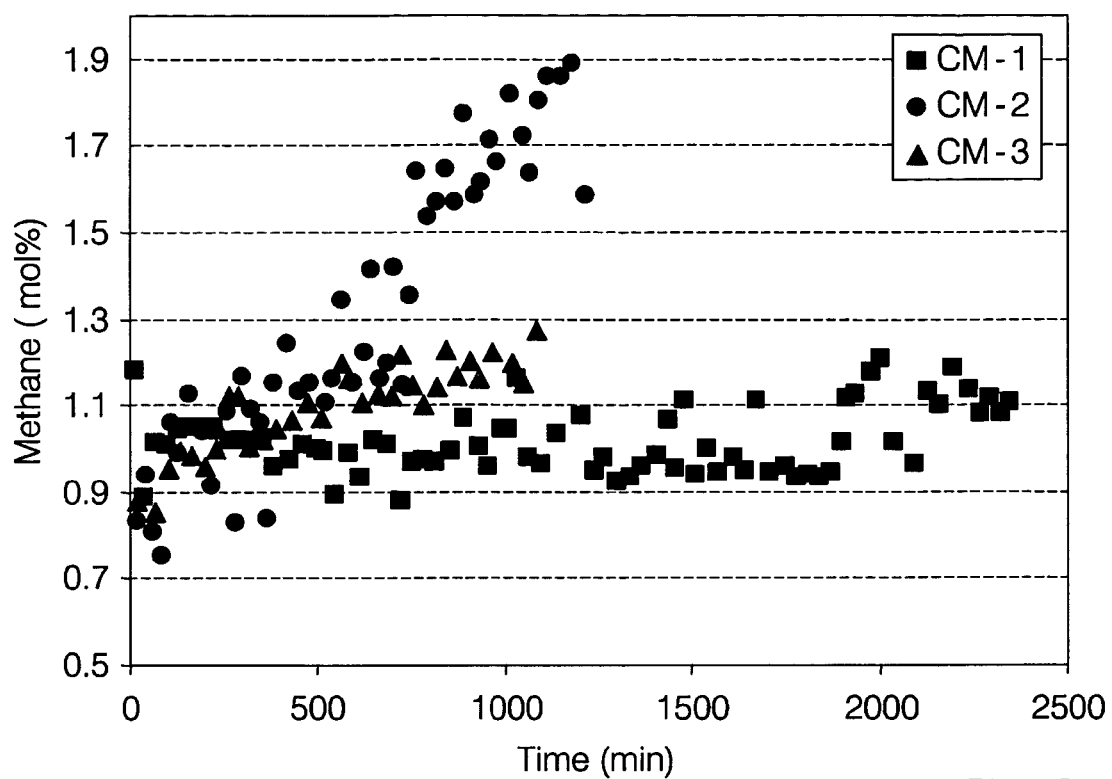
Figure 4:
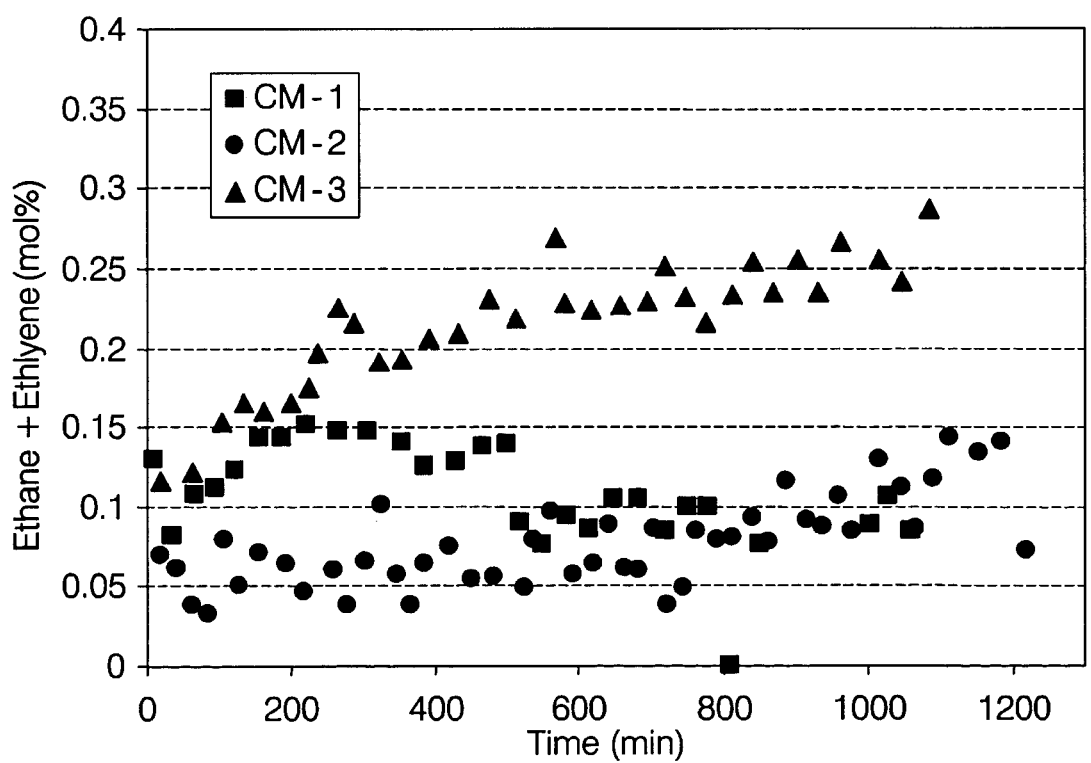
Figure 5:
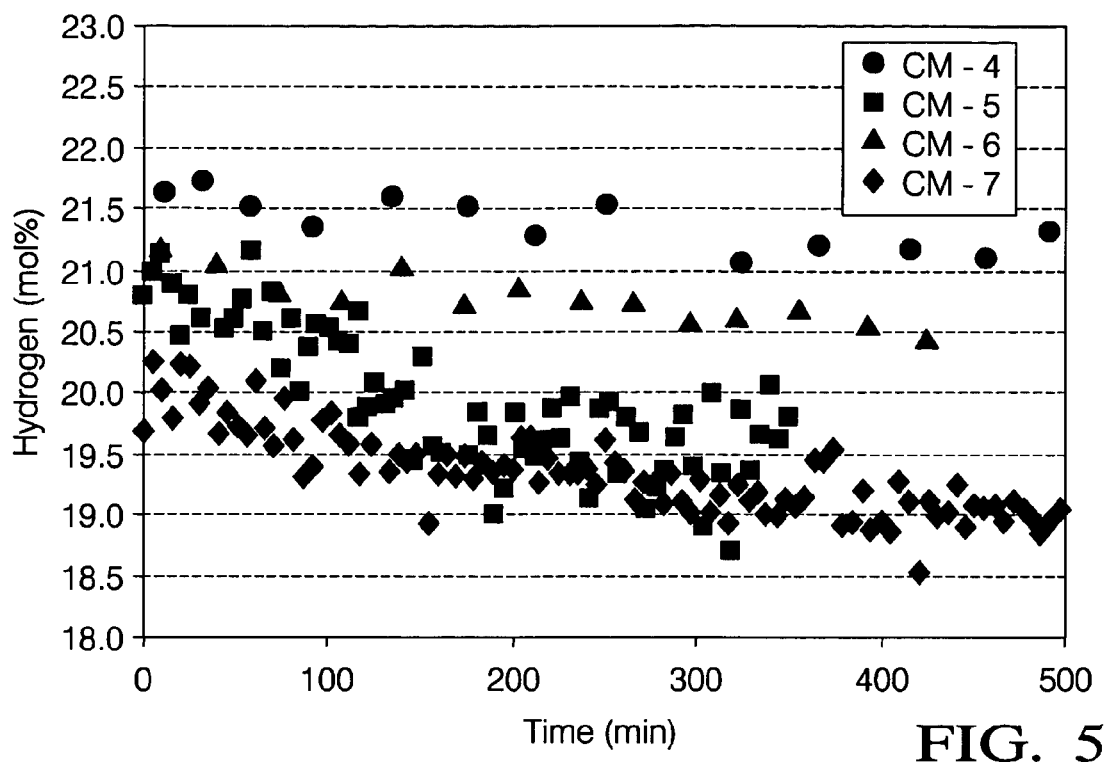
FIGS. 5-8 are plots of the relative hydrogen, carbon monoxide, methane and ethane-plus-ethylene content of effluent test gases of catalyst members described in Example 2 herein.
Figure 6:
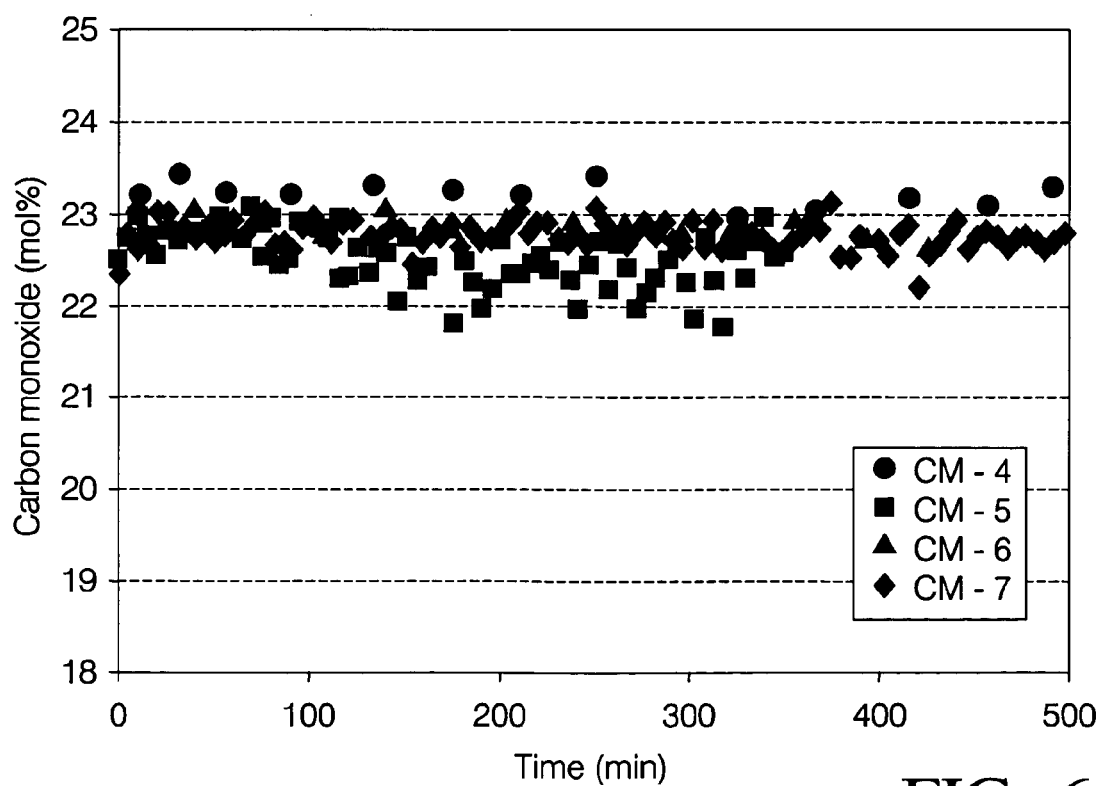
Figure 7:
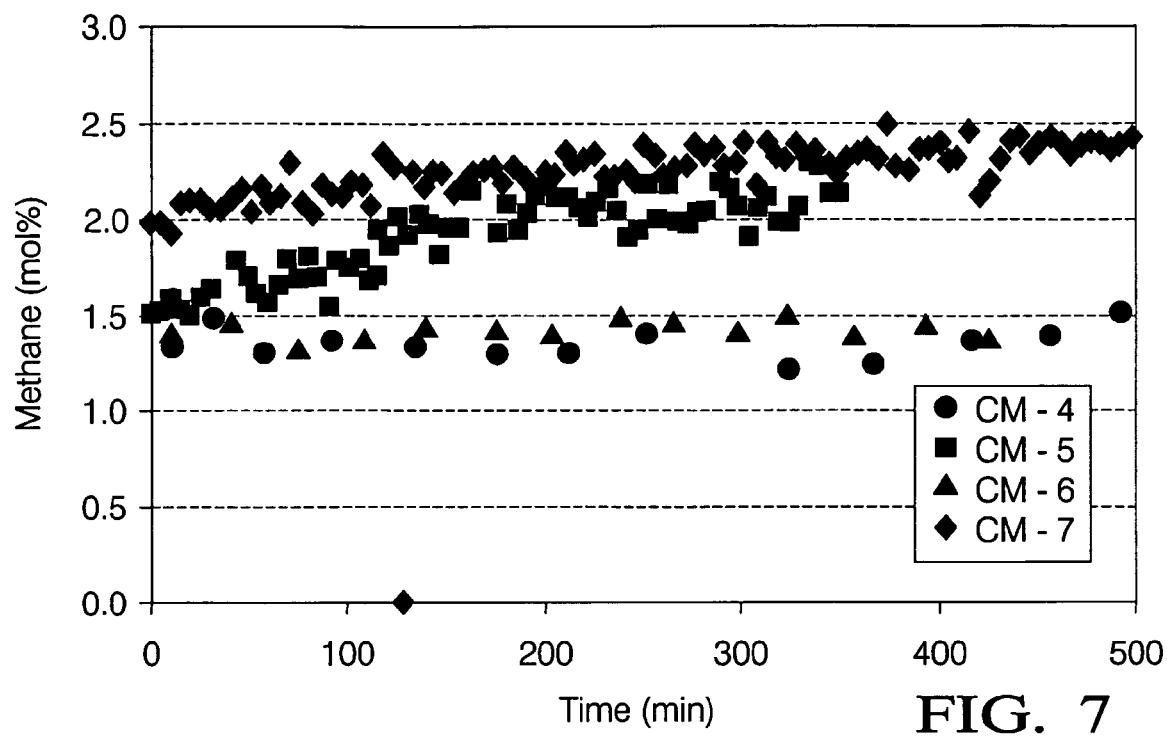
Figure 8:
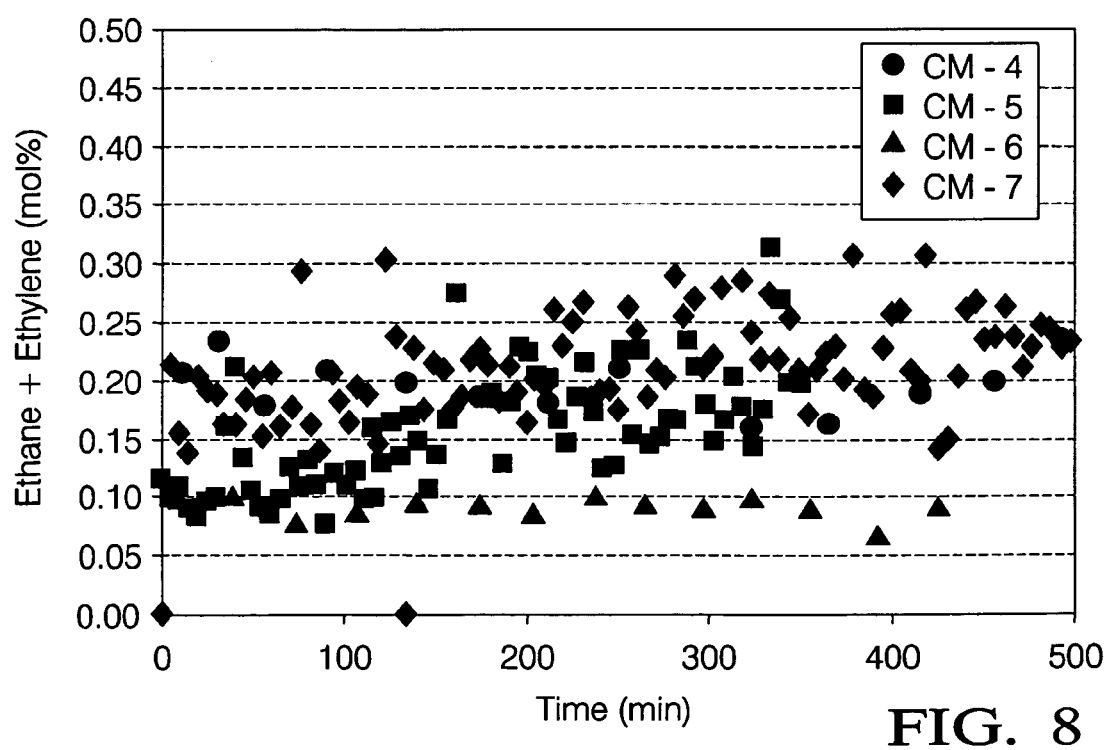
Figure 9:
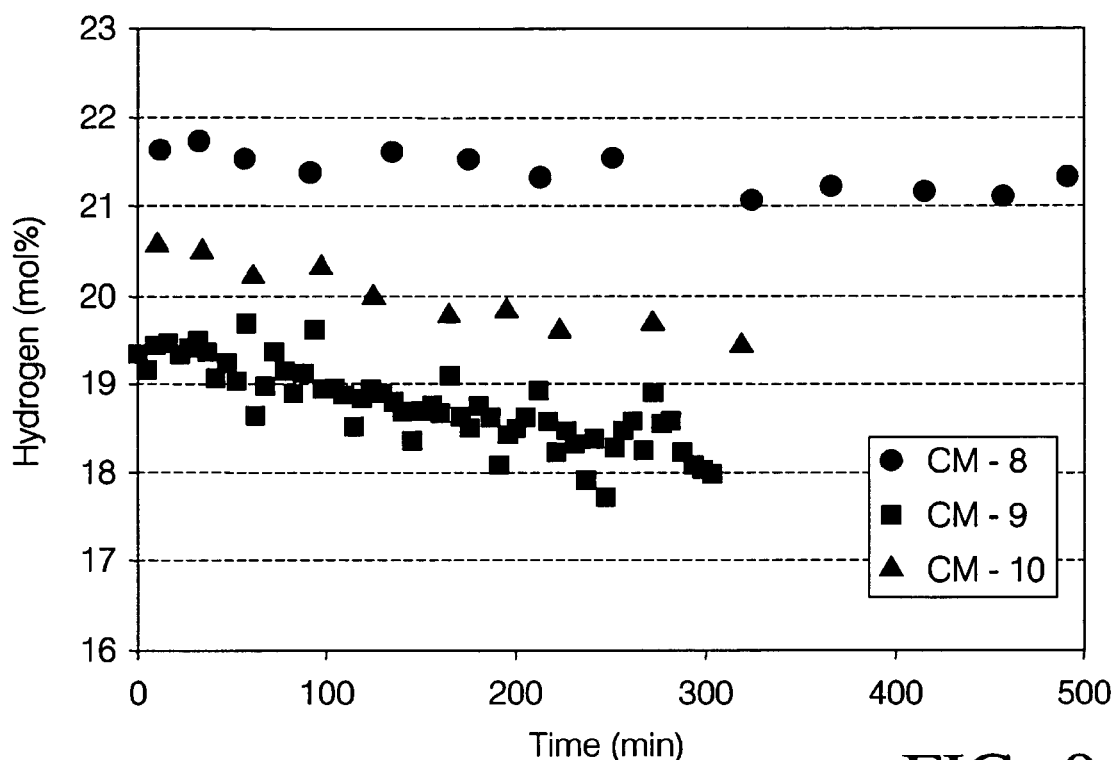
FIGS. 9-12 are plots of the relative hydrogen, carbon monoxide, methane and ethane-plus-ethylene content of effluent test gases of catalyst members described in Example 3 herein.
Figure 10:
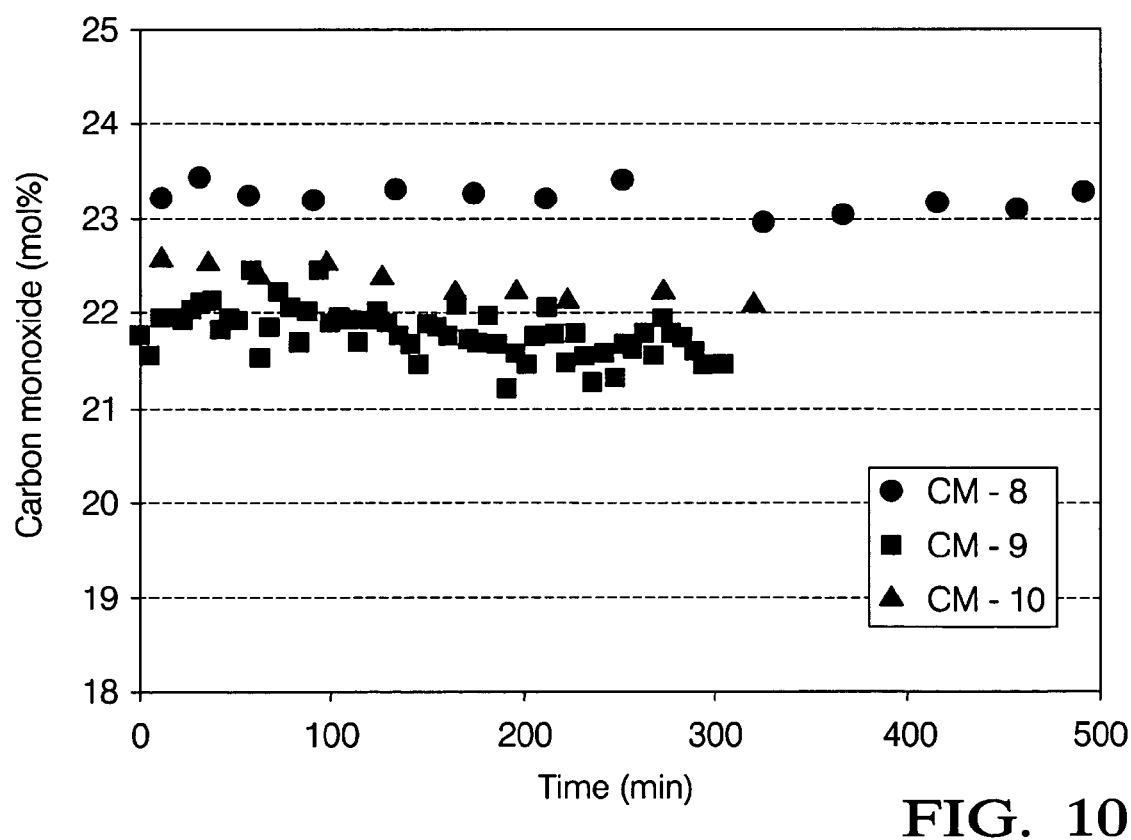
Figure 11:
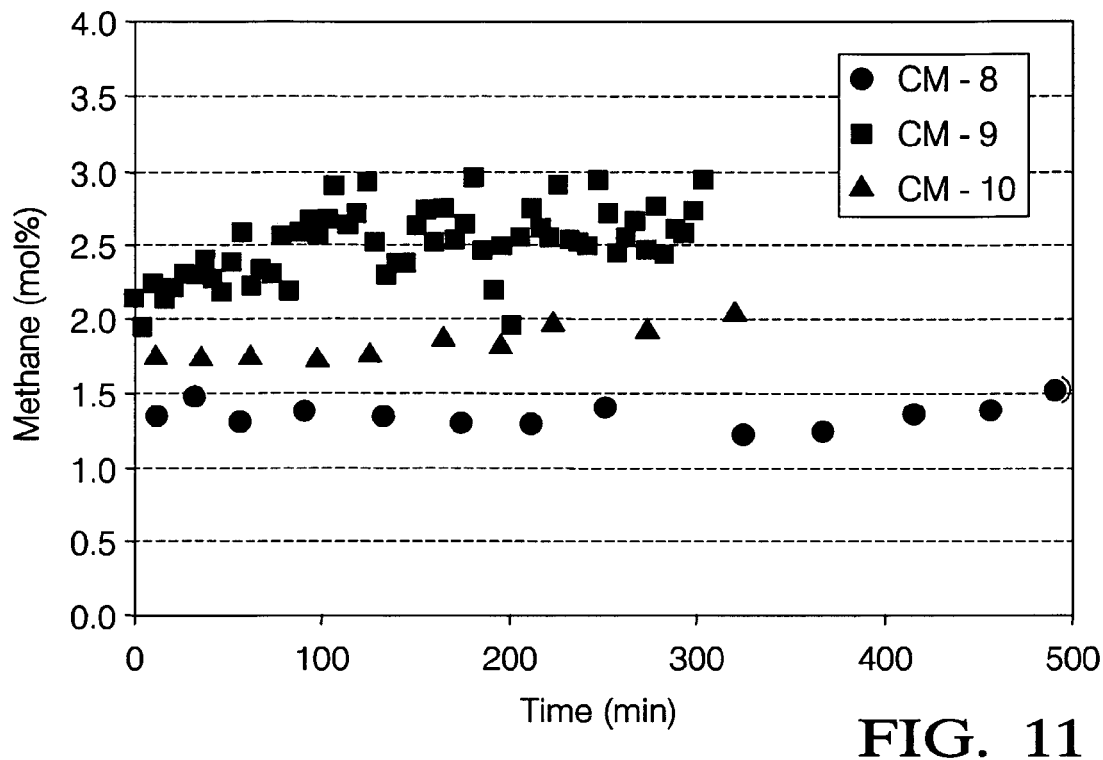
Figure 12:
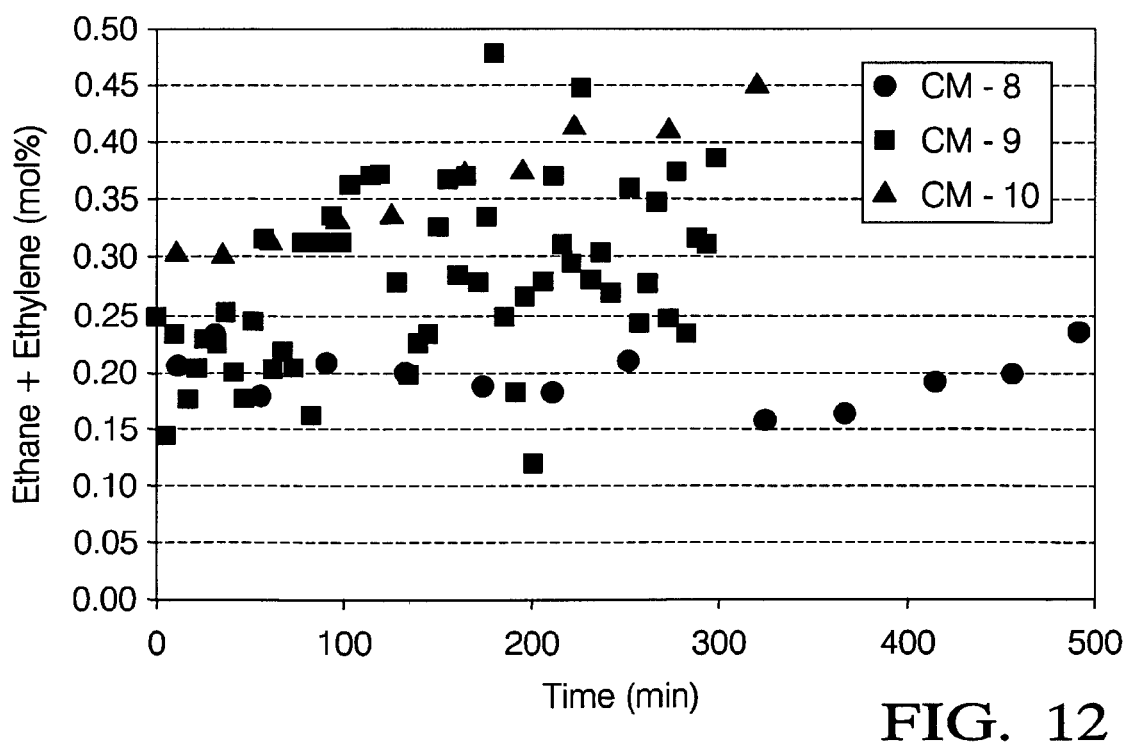
Figure 13:
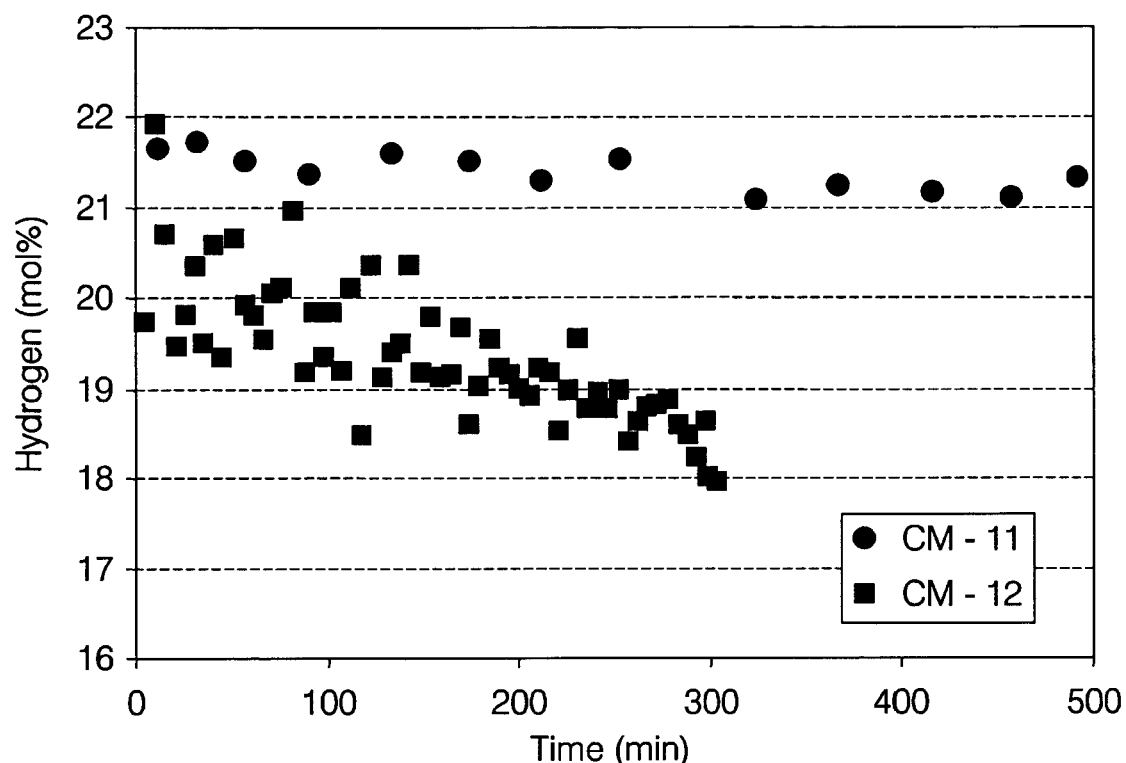
FIGS. 13-16 are plots of the relative hydrogen, carbon monoxide, methane and ethane-plus-ethylene content of effluent test gases of catalyst members described in Example 4 herein.
Figure 14:
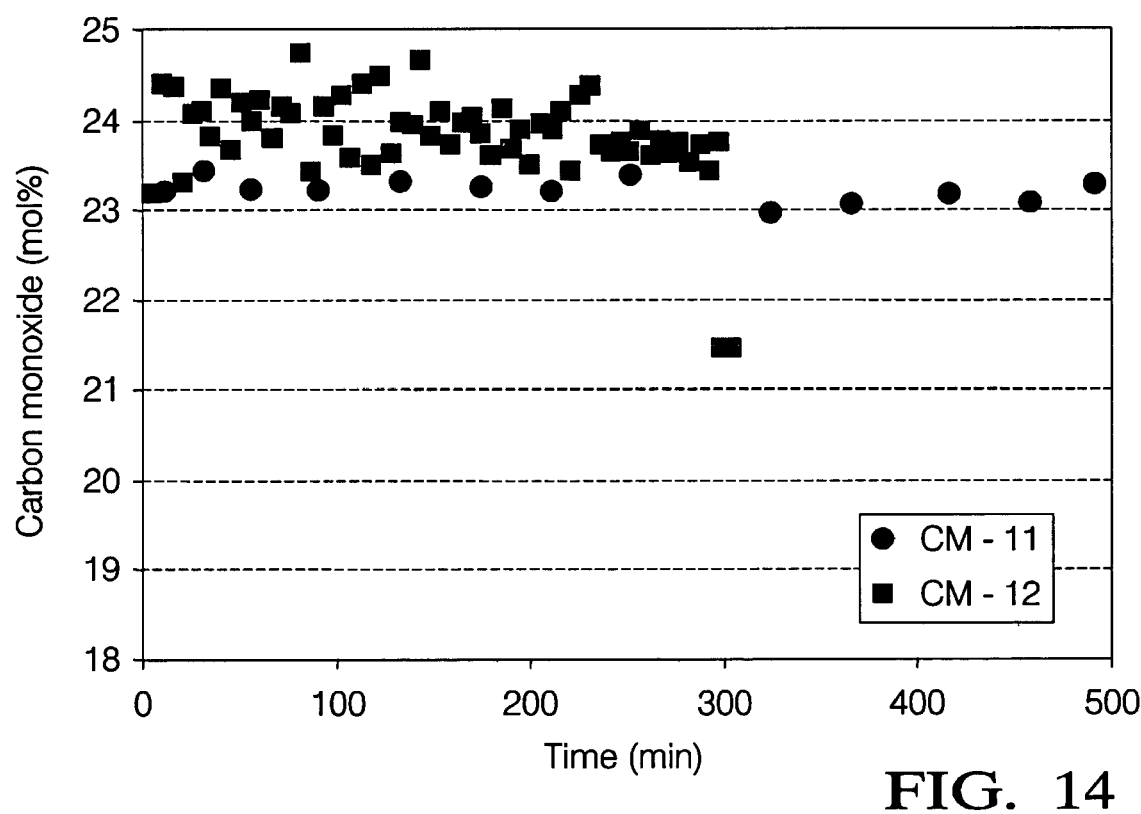
Figure 15:
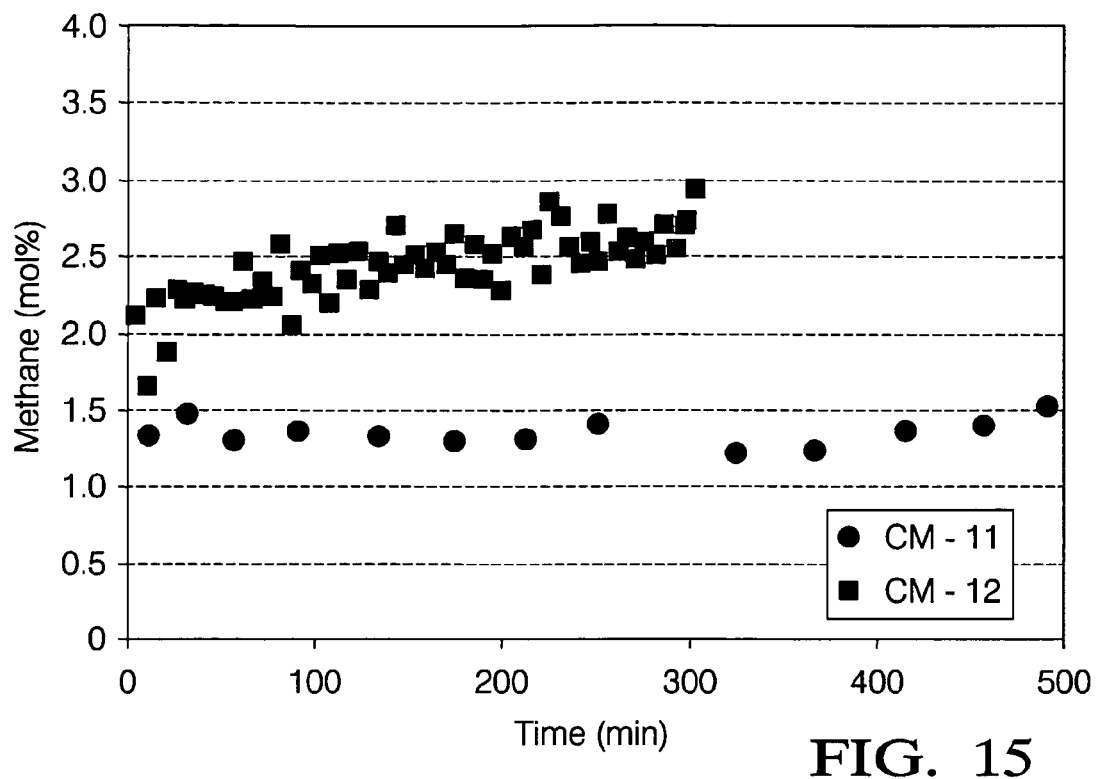
Figure 16:
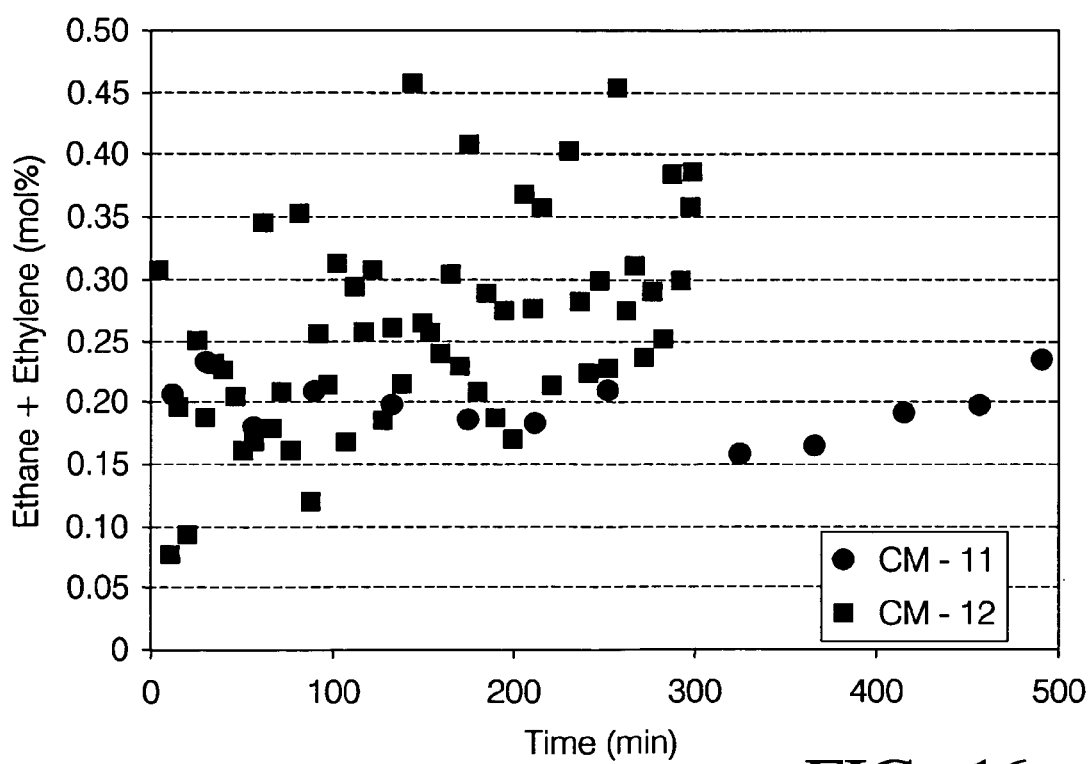

Unless otherwise specified, all ranges disclosed herein are inclusive and combinable at the end points and all intermediate points therein. Thus, a disclosure of "2% to 20%, optionally 5% to 15%" would include 5% to 20% and 2% to 5% and 4% to 12%. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The terms "a" and "an" herein do not denote a limitation of quantity, but rather denote the presence of at least one of the referenced item.

A catalyst member that provides improved performance for catalytic partial oxidation of hydrocarbons comprises a carrier substrate on which is deposited rhodium and a base metal catalytic component comprising a base metal (e.g., comprising nickel, cobalt, and combinations comprising at least one of the foregoing base metals). When nickel is present in the base metal catalytic component, the rhodium and the nickel may initially be segregated from each other by depositing them on a carrier substrate in separate layers. For example, the rhodium may be segregated from the nickel by depositing the nickel onto the substrate, and then depositing a rhodium catalytic material over the nickel. Rhodium may be segregated from cobalt in analogous ways. As used herein and in the claims, the term "catalytic material" refers to a catalytic component (i.e., a catalytically active species, such as rhodium, nickel, cobalt, and the like) dispersed on a support material. Optionally, the base metal catalytic component may be deposited onto the substrate as a catalytic material. The carrier substrate is configured to permit the flow therethrough of a gas stream containing hydrocarbons to be acted upon by the rhodium and the base metal thereon. The carrier substrate may be disposed in a canister having a gas inlet and gas outlet to define a flow path through the carrier substrate.

Any carrier substrate that can receive catalytic components thereon, that is configured to permit gas flow therethrough, and that is capable of withstanding the conditions under which catalytic partial oxidation process occurs, may be employed. One possible configuration of such a substrate is a monolithic "honeycomb" having a plurality of gas flow passages extending therethrough from an inlet to an outlet face of the carrier. The passages, which may be optionally be straight from their fluid inlet to their fluid outlet, are defined by walls on which catalytic components may be deposited (optionally as "washcoats") so that the gases flowing through the passages contact the catalytic component. The gas flow passages may be of any suitable cross-sectional shape and size, and there may be tens or hundreds of gas inlet openings ("cells") per square inch of cross section of the substrate. Alternatively, the substrate may be in the form of a foamed monolithic structure, which may be characterized in terms of the number of pores per inch of the substrate ("ppi"), or in the form of a bed of pellets, beads or the like. The substrate may be made of any suitable material capable of withstanding the operating conditions of the catalyst member, e.g., a refractory material, for example, a ceramic material. In a particular embodiment, the substrate may comprise zirconia-toughened alumina (ZTA). Flow-through substrates made from metals or metal alloys may also be used.

One method for depositing a catalytic component onto a carrier substrate is to coat the substrate with a slurry comprising support material particles and the catalytic component dissolved or suspended therein, and then drying and calcining the coated substrate. For example, a nickel catalytic component may be deposited onto a substrate in the form of a slurry that contains a charge of support material and an unsupported compound of the nickel catalytic component dissolved or suspended therein. A cobalt catalytic component may be deposited onto a carrier in analogous ways, optionally in combination with the nickel catalytic component. The coated carrier substrate may then be dried and calcined to form one or more layers of base metal, e.g., a layer comprising nickel catalytic material (a "nickel layer"), a layer of cobalt catalytic material (a "cobalt layer"), a layer comprising both nickel and cobalt (a "nickel-cobalt" layer), or a combination comprising any of the foregoing layers.

The rhodium catalytic material may then be deposited on the carrier substrate over the base metal catalytic layer, and the substrate may again be dried and calcined to form a rhodium layer over the base metal catalytic layer. Optionally, a slurry comprising a support material and a rhodium compound dissolved or suspended therein may be coated onto the carrier substrate. Subsequent drying and calcining disposes the rhodium catalytic component onto the support material in an upper layer over the base metal catalytic layer. Without wishing to be bound by any particular theory, it is believed that even though the dissolved rhodium compound may be exposed to the base metal, the majority of the rhodium will remain in the upper layer because the base metal will occupy the majority of the binding sites of the support material of the lower layer.

Alternatively, a catalytic material in a form suitable for disposing onto a carrier substrate may be prepared by dispersing a catalytic component onto a particulate support material before the catalytic component is deposited onto the substrate. In one such embodiment, an aqueous catalytic solution comprising a water-soluble compound of the catalytic component, e.g., a water-soluble salt, may be impregnated into particles of a support material. The wet, impregnated support material may then be dried and calcined to yield a catalytic material comprising the catalytic component dispersed onto the support material. To dispose catalytic component on the substrate, the catalytic material may be rendered in a catalytic slurry that may be coated onto the carrier substrate. The coated substrate may then be dried and calcined to remove the solvent and bind the catalytic material to the substrate.

In the foregoing methods for depositing catalytic components onto the carrier substrate, the base metal is not dispersed onto the same support particles that bear the majority of the rhodium, so the rhodium is segregated from the nickel. Without wishing to be bound by any particular theory, it is believed that by segregating rhodium and the base metal (e.g., nickel) from each other on the carrier, deleterious interaction between the rhodium and base metal, such as the possible formation of a rhodium-nickel alloy, is inhibited. Accordingly, in an exemplary embodiment, the rhodium layer may be formed from rhodium catalytic material that may be substantially free of co-impregnated nickel (i.e., no nickel is added to the rhodium catalytic material), and the base metal catalytic layer (e.g., nickel layer) may be formed from base metal catalytic material that is substantially free of rhodium (i.e., no rhodium is added to the base metal catalytic material), so that the rhodium is segregated from the base metal in the fresh catalyst member. It is noted that such segregation need not be absolute and need not be maintained during the useful life of the catalyst member. There may be, for example, less than or equal to 1 mole % base metal (e.g., nickel) in the rhodium catalytic material, based on the total mole content of rhodium plus base metal in the rhodium layer. Conversely, there may be less than or equal to 1 mole % rhodium in the base metal catalytic layer based on the total moles of rhodium plus base metal in the base metal catalytic layer.

A support material for the catalytic component may be thermally stable, so that catalytic performance will not degrade too severely when subjected to the expected temperatures of use. For example, the support material may comprise alpha-alumina. Gamma-alumina tends to be thermally unstable, but gamma-alumina modified by a stabilizing species, e.g., a rare earth-modified alumina such as lanthanum- or yttrium-modified gamma-alumina, or alkali- or alkaline earth-stabilized alumina such as barium-modified alumina, or physically stabilized gamma-alumina may be employed. The support materials for the rhodium, and the base metal may each have an average particle size of about 1 micrometer (µm) to about 20 µm, optionally about 1 µm to about 5 µm, as may any optional additional bulk component.

Additives (e.g., stabilizers and/or the like) may be co-impregnated into a support material with the rhodium or base metal in a catalytic solution. For example, barium sulfate may be included in a catalytic solution with rhodium for use with a support material comprising alpha-alumina. The barium sulfate may optionally be omitted when the support material comprises stabilized gamma-alumina such as lanthanum-stabilized alumina. Optionally, one or more alkali, alkaline earth and/or rare earth metal oxides may be included in bulk form in either the rhodium or the base metal. ("Bulk form" indicates separately formed and physically distinct particles (prior to calcination), in contrast to the impregnation of soluble compounds of two catalytic components into a common charge of support material.)

When a catalytic component is dispersed on a support material to form a catalytic material, the loading of the catalytic component may be expressed in terms of its weight percent (wt %), i.e., its weight in a sample of catalytic material relative to the total weight of the sample (on a dry basis). In particular embodiments, there may be about 0.5 wt % to about 10 wt % base metal in the base metal catalytic material, optionally about 2 wt % to about 5 wt % base metal. Similarly, the rhodium catalytic material may comprise about 0.5 wt % to about 10 wt % rhodium, optionally about 2 wt % to about 5 wt % rhodium. In an exemplary embodiment, the rhodium catalytic material may comprise about 1 wt % to about 2 wt % rhodium.

When a catalytic component (or additive) is deposited onto a flow-through substrate to form a catalyst member, the amount of the catalytic component (or additive), and/or of the catalytic material of which it is a part, is sometimes characterized in terms of density within the catalyst member, e.g., in terms of grams per cubic inch ($g/in^3$) or grams per cubic foot ($g/ft^3$) of the catalyst member. A catalyst member useful for catalytic partial oxidation of hydrocarbons as described herein may comprise about 10 $g/ft^3$ to about 500 $g/ft^3$ (about $0.353\times10^{-3}$ g/cc to about $17.7\times10^{-3}$ g/cc) of base metal, optionally about 50 $g/ft^3$ to about 160 $g/ft^3$ (about $1.8\times10^{-3}$ g/cc to about $5.7\times10^{-3}$ g/cc) base metal; in an exemplary embodiment, the catalyst member may comprise about 110 $g/ft^3$ (about $3.9\times10^{-3}$ g/cc) base metal. The catalyst member may comprise about 20 $g/ft^3$ to about 50 $g/ft^3$ (about $7\times10^4$ g/cc to about $17.65\times10^{-4}$ g/cc) rhodium, optionally about 30 $g/ft^3$ to about 40 $g/ft^3$ (about $1\times10^{-3}$ g/cc to about $1.4\times10^{-3}$ g/cc) rhodium. The loading of a catalytic material on a substrate may be adjusted to achieve a desired density of the catalytic component in the catalyst member. Optionally, the rhodium (Rh) and base metal are applied on the substrate in amounts that provide Rh:(base metal) weight ratio of about 10:1 to about 1:10, for example, about 1:1 to about 1:3 on the catalyst member.

As demonstrated herein, a catalyst member comprising a substrate carrying a rhodium layer deposited over a base metal catalytic component exhibits surprisingly superior performance for the catalytic oxidation of hydrocarbons, especially if the rhodium is segregated from the nickel. The data presented herein shows that such catalyst members yield this improved performance during the course of extended test procedures even though it is believed that, during the test, there may be some migration of base metal into the rhodium material and/or some migration of rhodium into the base metal catalytic layer.

EXAMPLES

Several catalytic slurries, in which catalytic metals (rhodium (Rh), platinum (Pt), palladium (Pd), and nickel (Ni)) are provided in quantities designed to yield loadings of about 2 wt % catalytic metal on the support material, by weight, based on the combined weight of the catalytic metals and support material (dry basis), were prepared as follows.

Platinum Catalytic Slurry (Designated CS-1)

A platinum catalytic slurry containing platinum (Pt), barium sulfate, alpha alumina, and water was prepared by combining 3.06 grams of an aqueous platinum nitrate solution comprising about 14 wt % platinum nitrate by weight of the solution; 1.8 grams barium sulfate ($BaSO_4$); and 50 grams of an aqueous slurry of alpha alumina particles having an average particle size of about 2.3 micrometers (μm) (measured along the major axis using a laser particle size analyzer from Malvern Instruments Ltd.), and comprising about 44 wt % solids by weight of the alumina slurry. The resulting Pt-alpha-alumina slurry had a pH of about 2 and contained about 0.0076 grams of platinum per gram of the slurry.

Palladium Catalytic Slurry (Designated CS-2)

A palladium (Pd) catalytic slurry was prepared in the same manner as the platinum slurry CS-1, except that, in place of the platinum nitrate solution, 2.75 grams of a palladium nitrate solution containing about 15% palladium nitrate by weight of the solution, was used. The resulting Pd-alpha-alumina slurry had a pH of about 1.6 and contained about 0.0076 grams of palladium per gram of slurry.

Rhodium Catalytic Slurry (Designated CS-3)

A rhodium (Rh) catalytic slurry was prepared in the same manner as the platinum slurry CS-1, except that, in place of the platinum nitrate solution, 4.27 grams of a rhodium nitrate solution containing about 9.7% rhodium nitrate by weight of the solution, was used. The resulting Rh-alpha-alumina slurry had a pH of about 1.9 and contained about 0.0074 grams of rhodium per gram of slurry.

Nickel Catalytic Slurry (Designated CS-4)

A nickel (Ni) catalytic slurry was prepared in the same manner as the platinum catalytic slurry CS-1, except that in place of the platinum nitrate solution, 1.8 grams of nickel acetate tetrahydrate, was used. The resulting Ni-alpha-alumina slurry had a pH of about 5.9 and contained about 0.0078 grams nickel per gram of slurry.

Second Rhodium Catalytic Slurry (Designated CS-5)

A second Rh-gamma-alumina catalytic slurry was prepared as described above for slurry CS-3, except that in place of alpha-alumina, gamma-alumina was used without the barium sulfate additive.

Second Nickel Catalytic Slurry (CS-6)

A second nickel catalytic slurry was prepared in the same manner as the nickel catalytic slurry CS-4, except that in place of alpha-alumina, gamma-alumina was used without the barium sulfate additive.

Third Rhodium Catalytic Slurry (CS-7)

A third Rh-gamma-alumina catalytic slurry was prepared as described above for slurry CS-3, except that in place of alpha-alumina, a lanthanum stabilized gamma-alumina was used.

Third Nickel Catalytic Slurry (CS-8)

A third nickel catalytic slurry was prepared in the same manner as the nickel catalytic slurry CS-4, except that in place of alpha-alumina, a lanthanum stabilized gamma-alumina was used.

Catalytic slurries as described above may be dried and calcined to form catalytic materials comprising catalytic metals dispersed on the particulate support materials; the catalytic materials may then be formed into slurries and coated onto carrier substrates, which are then dried and calcined. Alternatively, the catalytic slurries may be deposited directly onto a substrate, which is then dried and calcined.

Example 1

A dual-layered Rh/Ni catalyst member (designated CM-1) was prepared by depositing about 1.86 grams (g) of nickel catalytic slurry CS-4 on a generally cylindrical foamed zirconia-toughened alumina (ZTA) substrate (designated S-1) having about 20 pores (passages) per inch and a length and diameter each of about 1 inch (2.54 centimeters). The coated substrate was then dried and calcined for 1 hour at 538° C. A nickel layer comprising about 0.92 g of nickel catalytic material was thus deposited on the substrate. Then, about 2.2 g of rhodium catalytic slurry CS-3 was deposited on the substrate, which was again dried and calcined for 1 hour at 538° C., resulting in a rhodium layer of about 1.02 grams of rhodium catalytic material over the nickel layer, with the rhodium thus segregated from the nickel. The resulting Rh/Ni catalyst member comprised about 35 g/ft³ rhodium and about 32 g/ft³ nickel.

An Rh-gamma-alumina catalyst member (designated CM-2) was prepared according to the procedure for CM-1 by depositing a charge of rhodium catalytic slurry CS-5 on a substrate configured like substrate S-1 (i.e., 20 pores per inch, length and diameter of 1 inch (2.54 cm) each), and drying and calcining the coated substrate.

An Rh-alpha-alumina catalyst member (designated CM-3) was prepared by depositing a charge of rhodium catalytic slurry CS-5 on a substrate configured like substrate S-1. The coated substrate was dried and calcined.

Catalyst members CM-1 (Rh/Ni), CM-2 (Rh-γ-$Al_2O_3$), and CM-3 (Rh-α-$Al_2O_3$), all contained about 35 g/ft³ of rhodium.

Catalyst members CM-1, CM-2, and CM-3 were subjected to testing using gasoline vapor having a composition complying with California Air Resources Board (CARB) Phase II requirements, at a temperature of about 250° C., and a space velocity of about 44,500 hours, with a stoichiometric oxygen/carbon ratio of about 1.05:1, and at catalyst operating temperatures of about 950° C. to about 1,050° C. The effluent was tested to determine the content of hydrogen, carbon monoxide, methane, ethane, and ethylene. The results are set forth in FIGS. 1-4, respectively.

The data of FIGS. 1-4 shows that catalyst member CM-1 (Rh/Ni) yielded better partial oxidation performance than catalyst members CM-2 (Rh-γ-$Al_2O_3$). and CM-3 (Rh-α-$Al_2O_3$); i.e., CM-1 yielded more hydrogen than the other catalyst members, and the production of hydrogen and carbon monoxide were better and more consistent during the course of the test than was seen for the other catalyst members.

In particular, catalyst member CM-1 produced about 22 mole % hydrogen throughout the first 1,200 minutes of the test with no substantial loss in activity, and produced more than 21 mole % hydrogen even after about 2,400 minutes (about 40 hours), whereas CM-2 started at about 21 mole % and fell to about 18.3 mole % (an activity loss of about 12.5% (i.e., (21-18.3)/21) after 1,000 minutes. CM-3 started at about 21.5 mole % and fell to about 20.7 mole % for an activity loss of about 3.7% after 1,000 minutes. CM-1 also generated less methane, the content of which in the test gas started at about 1.2 mole % and was less than about 1.1 mole % after the first 1,000 minutes, whereas both CM-2 and CM-3 started at about 1 mole % methane and, in the case of CM-2, increased to about 1.7 mole % (an increase of 70%) and, in the case of CM-3, increased to more than 1.2 mole % (an increase of 20%). This data shows that CM-1 exhibited superior initial performance and longer-term consistency relative to CM-2 and CM-3. Maintaining consistent performance is especially desirable in a catalyst suitable for generating hydrogen for use in a fuel cell. Consistent performance can be describe for purposes of this test as a demonstrated activity loss for the generation of hydrogen of less than or equal to 3%, optionally less than or equal to about 2% or, in a particular embodiment, less than or equal to about 1% after 1,000 minutes of testing, and even after 1,500 minutes of testing.

Example 2

A dual-layered Rh/Ni catalyst member (designated CM-4) was prepared in a manner similar to CM-1. A dual-layered Rh/alpha-alumina catalyst member (designated CM-5) was prepared using the rhodium catalytic material as in catalyst member CM-4 over a layer of alpha alumina having no catalytic metal thereon, i.e., over a 'blank' undercoat layer. A dual-layered Rh/Co catalyst member (designated CM-6) was prepared by a procedure like that for CM-1, except that cobalt was used in place of nickel in the lower layer, in an amount of about 2 wt % cobalt by weight of the slurry. In addition, a single-layered Rh-alpha-alumina catalyst (designated CM-7) was prepared in a procedure similar to that for CM-3. Catalyst members CM-4, CM-5, CM-6 and CM-7 all contained about 35 g/ft³ of rhodium.

Catalyst members CM-4 (dual layer Rh/Ni), CM-5 (dual layer Rh/α-$Al_2O_3$), CM-6 (dual layer Rh/Co) and CM-7 (Rh-α-$Al_2O_3$) were thermally aged by placing them in an oven at 1,200° C. in air for ten hours. They were allowed to cool and were then tested as described above in Example 1. The results are set forth in FIGS. 5-8.

The data of FIGS. 5-8 shows that catalyst member CM-4 (Rh/Ni) exhibited good performance stability for partial oxidation over the course of the test, while catalyst member CM-5 (Rh/γ-$Al_2O_3$) and catalyst member CM-7 (Rh-α-$Al_2O_3$) failed rapidly. Specifically, CM-4 produced more than 21 mole % hydrogen throughout 500 minutes of the test, beginning and ending at about 21.5 mole %, whereas CM-6 started at about 21.1 mole % and fell to about 20.5 mole % (an activity loss of 2.84%) after only about 400 minutes. CM-5 started at about 21 mole % and ended at about 20 mole % after only about 350 minutes (an activity loss of 4.76%) after generally following the performance of CM-7, which started around 20 mole % and fell to less than 19.5 after only about 250 minutes (an activity loss of 2.50%), ending at about 19 mole % (an activity loss of 5.00% after 500 minutes). This data shows that the use of an undercoat comprising nickel gives superior performance, even after aging, and that a blank undercoat does not yield the improvement discovered with a nickel undercoat. Consistent performance for purposes of this data may be considered to be a loss activity for the generation of hydrogen of not more than about 2.4%, optionally not more than 2%, e.g., a loss of not more than 1% over a 500 minute test as described herein.

Example 3

Three dual-layered catalyst members were prepared comprising various platinum group metal catalytic materials disposed over layers of nickel-alumina catalytic material. A dual-layered Rh/Ni catalyst member (designated CM-8), a dual-layered Pt/Ni catalyst member (designated CM-9), and a dual-layered Pd/Ni catalyst member (designated CM-10). Catalyst members CM-8, CM-9 and CM-10 all contained about 35 g/ft³ of rhodium, platinum, or palladium, respectively. The catalyst members were aged as described above in Example 2 and were tested as described above in Example 1. The results are set forth in FIGS. 9-12.

The data of FIGS. 9-12 shows that catalyst member CM-8 (Rh/Ni) provides distinctly superior performance and consistency relative to catalyst members CM-9 (Pt/Ni) and CM-10 (Pd/Ni). Specifically, catalyst member CM-8 produced between 21 mole % and 22 mole % hydrogen throughout the entire 500 minute test, whereas CM-9 fell from about 19.2 mole % to about 18 mole % after the first 300 minutes (an activity loss of about 6%) and CM-10 fell from about 20.5 mole % to about 19.5 mole % (an activity loss of about 4%) after the first 300 minutes. Similarly, CM-8 produced generally more than 23 mole % carbon monoxide throughout the entire 500 minute test (except for one anomalous data point, which is disregarded), whereas CM-9 produced less than 22.5 mole % throughout the first 300 minutes and CM-10 fell from about 22.5 mole % to about 22 mole % over that time. CM-8 produced less methane, i.e., not more than 1.5 mole % throughout the first 500 minutes of the test, whereas CM-9 started at about 2.1 mole % and increased to about 3 mole %, while CM-10 started at about 1.75 mole % and rose to about 2 mole % through the first 300 minutes of the test. Finally, CM-9 was producing less ethane and ethylene than both CM-9 and CM-10 after the first 250 minutes of the test.

Example 4

A dual-layered Rh/Ni catalyst member, designated CM-11, was prepared as described above for CM-1 and a single-layer Rh—Ni catalyst member designated CM-12 was prepared from a catalytic material comprising both rhodium and nickel co-impregnated into an alumina support material, so that the rhodium was not segregated from the nickel. Catalyst members CM-11 (Rh/Ni) and CM-12 (Rh—Ni) both contained a loading of about the same loadings (g/ft$^3$) of rhodium and nickel. They were aged as described above in Example 2 and were then tested as described in Example 1. The results are set forth in FIGS. 13-16.

The data of FIGS. 13-16 shows that CM-11 consistently produced more than 21 mole % hydrogen throughout 500 minutes of the test, whereas CM-12 started at about 20 mole % and fell to about 18 mole % (an activity loss of 10%) after only 300 minutes. CM-11 also produced less methane, achieving a mole % that did not exceed 1.5 in the first 500 minutes, whereas CM-12 began at about 2 mole % and steadily increased to about 3 mole % after only 300 minutes. Finally, CM-11 produced less ethane and ethylene, staying at less than 0.25 mole % throughout the first 500 minutes, whereas CM-13 yielded as much as 0.45 mole % during that interval. The data therefore shows that separating the rhodium and nickel into separate, segregated layers as in CM-11 results in unexpectedly superior performance for hydrogen production relative to a catalytic material comprising co-impregnated rhodium and nickel as in CM-12.

Example 5

A dual-layered Rh/Ni catalyst member designated CM-13 and a single-layer Rh-delta alumina catalyst member designated CM-14 were prepared; both catalyst members contained about 35 g/ft$^3$ rhodium. Catalyst members CM-13 (Rh/Ni) and CM-14 (Rh-δ-Al$_2$O$_3$) were tested generally as indicated above in Example 1 under conditions that allow the catalyst members to attain steady state performance. Then, the catalyst members were subjected to thermal treatments wherein the air/fuel ratio was adjusted so that the reactor temperature increased from about 1,000° C. to about 1,300° C. for about 30 minutes; the air/fuel ratio was then readjusted to the original value, and a corresponding reduction in temperature followed. Catalyst member CM-13 was subjected to three such thermal treatment cycles, after which the O/C stoichiometric ratio was increased to 2:1 (the ratio for complete combustion) and the catalyst temperature exceeded 1,400° C. Catalyst member CM-14 was subjected to only one high temperature cycle. The effluent from each catalyst member was measured for hydrogen content and the results are set forth in FIGS. 17 and 18.

Figure 17:
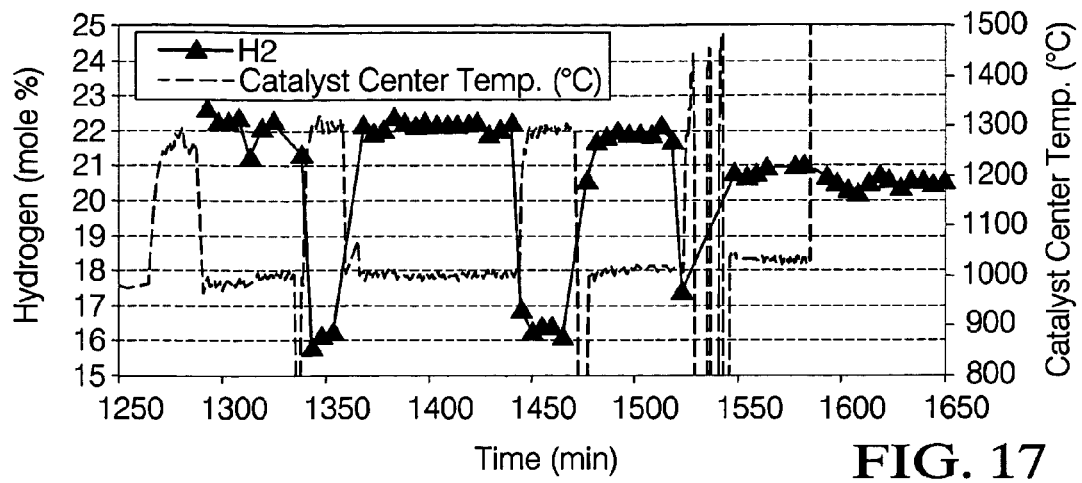
FIGS. 17 and 18 are plots of the relative hydrogen contents of test gases of catalyst members described in Example 5 herein.
Figure 18:
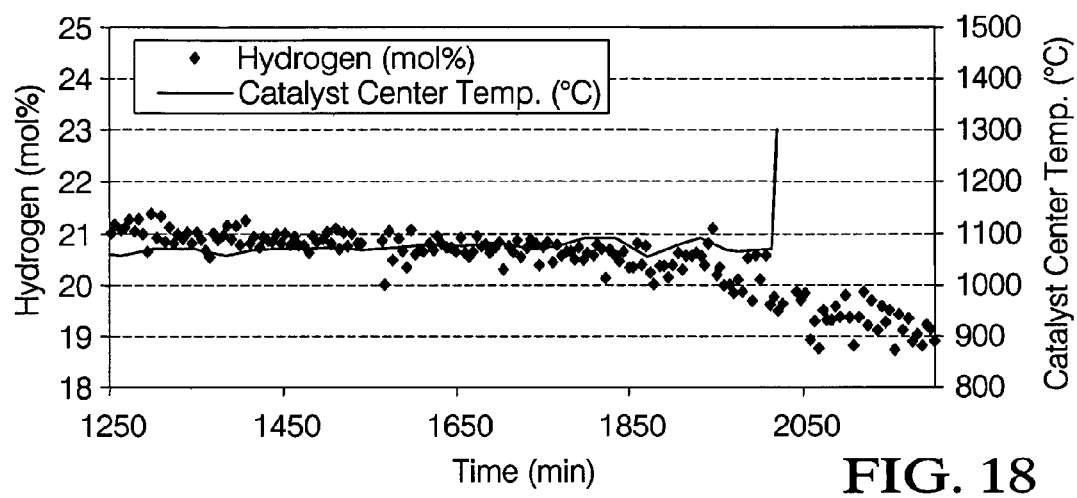

Although the thermal treatments began at different points on the time scales for the two catalyst members, the data showing catalytic performance for each catalyst member after the thermal treatments are comparable to each other. Therefore, FIGS. 17 and 18 show that by providing an under layer of nickel, the performance of a catalyst member is improved despite thermal treatment at temperatures as high as 1,300° C. Specifically, the hydrogen yield from catalyst member CM-13 started at about 22% in steady state performance prior to thermal treatment and returned to about 22% even after two thermal treatments, whereas the hydrogen yield of CM-14 dropped from about 21% steady state performance to about 19% (an activity loss of about 9.5%) after only one thermal treatment. Catalyst member CM-13 (Rh/Ni) was only minimally influenced by the three 1,300° C. thermal treatment cycles, and maintained good hydrogen concentration even after thermal treatment at 1,400° C.

Example 6

A dual-layered Rh/Ni catalyst member (designated CM-15) was prepared in a manner similar to CM-1, except that nickel slurry CS-6 was used to coat the bottom layer, and rhodium catalytic slurry CS-5 (which comprised gamma alumina without a stabilizer) was used as the top layer.

Another dual-layered Rh/Ni catalyst member (designated CM-16) was also prepared in a manner similar to CM-1, except that nickel slurry CS-8 was used to coat the bottom layer, and rhodium catalytic slurry CS-7 (which comprised lanthanum-stabilized gamma-alumina) was used as the top layer.

Figure 19:
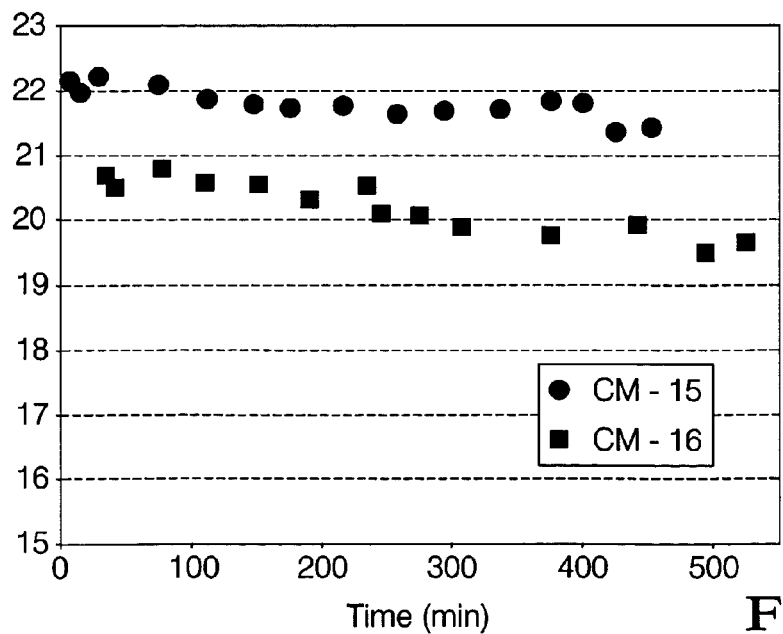
FIG. 19 is a plot of the relative hydrogen content of effluent test gases of catalyst members described in Example 6 herein.

Both catalyst members CM-15 and CM-16 were dried and calcined for 1 hour at 538° C. Then they were aged as described above in Example 2 and were then tested as described in Example 1. The comparison results are shown in FIG. 19, which shows that over the course of about 400 minutes of the test, catalyst member CM-16 yielded better production of hydrogen than catalyst member CM-15 throughout, and lost less than about 2% of its activity (falling from about 22 mole % to about 21.75 mole %), whereas catalyst member CM-15 lost about 5% of its activity (falling from about 20.75 mole % to about 19.75 mole %). The results show the advantage of employing a stable support material for a catalytic component.

The catalyst members and methods disclosed herein provide improved performance for catalytic partial oxidation of hydrocarbons. The catalyst members comprise a carrier substrate on which is deposited rhodium and a base metal catalytic component comprising nickel and/or cobalt. When nickel is present in the catalyst member, segregating the rhodium from the nickel is seen to yield improved performance with regard to initial catalytic activity and consistency of performance. With the current catalysts, a hydrogen yield of greater than or equal to 21 mole % for extended periods of time.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A catalyst member consisting of:
   a substrate configured for gas flow therethrough;
   a base metal catalytic component disposed in a base metal catalytic layer on the substrate, wherein the base metal catalytic component consists of a base metal selected from the group consisting of nickel, cobalt, and mixtures thereof;

a rhodium catalytic material disposed in a rhodium layer on top of the base metal catalytic layer; and wherein the base metal catalytic layer is disposed between the substrate and the rhodium layer.

2. The catalyst member of claim 1, wherein the base metal catalytic component consists of nickel and wherein rhodium was not added to the base metal catalytic layer during the formation thereof.

3. The catalyst member of claim 1, which exhibits an activity loss for the generation of hydrogen of less than or equal to 3% for a period of greater than or equal to about 1,000 minutes with an input stream comprising gasoline vapor at a temperature of about 250° C. at a space velocity of about 44,500 hour$^{-1}$, a stoichiometric oxygen/carbon ratio of about 1.05:1, and at catalyst operating temperatures of about 950° C. to about 1,050° C.

4. The catalyst member of claim 3, wherein the activity loss is less than or equal to about 2%.

5. The catalyst member of claim 4, wherein the activity loss is less than or equal to about 1%.

6. The catalyst member of claim 3, wherein the generation of the hydrogen is in an amount of greater than or equal to about 21 mole % for the period of greater than or equal to 2,400 minutes.

7. The catalyst member of claim 1, wherein the catalyst member contains about 10 g/ft$^3$ to about 500 g/ft$^3$ of the base metal.

8. The catalyst member of claim 1, wherein the catalyst member contains about 20 g/ft$^3$ to about 50 g/ft$^3$ rhodium per cubic foot of the base metal.

9. A method for making a catalyst member, consisting of:
depositing a base metal catalytic component as a base metal catalytic layer on a substrate configured for gas flow therethrough, wherein the base metal catalytic component consists of a base metal selected from the group consisting of nickel, cobalt, and mixtures thereof; and depositing a rhodium catalytic material in a rhodium layer over the base metal catalytic component, said base metal catalytic layer being disposed between the substrate and the rhodium layer.

10. The method of claim 9, wherein the base metal catalytic component consists of nickel, wherein rhodium was not added to the base metal catalytic component, and wherein nickel was not added to the rhodium catalytic material.

11. The method of claim 9, wherein depositing the base metal catalytic component on the substrate further comprises
coating the substrate with a slurry comprising a nickel compound and support material to form a nickel coated substrate,
drying the nickel coated substrate, and
calcining the nickel coated substrate to form a layer of nickel catalytic material before depositing the rhodium catalytic material thereon.

12. The method of claim 9, wherein depositing the layer of rhodium catalytic material further comprises
coating the substrate with a slurry comprising a rhodium compound and a second support material to form a rhodium coated substrate,
drying the rhodium coated substrate, and
calcining the rhodium coated substrate to form the layer of rhodium catalytic material.

13. The method of claim 9, wherein depositing the base metal catalytic component on the substrate further comprises coating the substrate with a slurry comprising a nickel compound and support material to form a nickel coated substrate, and wherein depositing the layer of rhodium catalytic material further comprises
coating the nickel coated substrate with a slurry comprising a rhodium compound and a second support material to form a rhodium coated substrate,
drying the rhodium coated substrate, and
calcining the rhodium coated substrate to form the layer of rhodium catalytic material.

14. The method of claim 13, wherein depositing the base metal catalytic component on the substrate further comprises drying the nickel coated substrate, and calcining the nickel coated substrate to form a layer of nickel catalytic material before depositing the rhodium catalytic material thereon.

15. The method of claim 9, wherein the catalyst member comprises about 10 g/ft$^3$ to about 500 g/ft$^3$ of the base metal.

16. The method of claim 9, wherein the catalyst member comprises about 20 g/ft$^3$ to about 50 g/ft$^3$ rhodium per cubic foot of the base metal.

17. A method for catalyzing the partial oxidation of hydrocarbons in a gas stream, consisting of
contacting a catalyst member with the gas stream, wherein the catalyst member consists of a substrate, a rhodium catalytic layer, and a base metal catalytic layer disposed between the substrate and the rhodium catalytic layer, wherein the base metal catalytic layer consists of a base metal selected from the group consisting of nickel, cobalt, and mixtures thereof; and converting hydrocarbon in the gas stream to hydrogen;

wherein the catalyst member has an activity loss for the generation of the hydrogen of less than or equal to 3% for a period of greater than or equal to about 1,000 minutes when tested with an input stream comprising gasoline vapor at a temperature of about 250° C. at a space velocity of about 44,500 hour$^{-1}$, a stoichiometric oxygen/carbon ratio of about 1.05:1, and at catalyst operating temperatures of about 950° C. to about 1,050° C.

* * * * *